United States Patent
Sekine et al.

[11] Patent Number: 5,984,790
[45] Date of Patent: Nov. 16, 1999

[54] UNIVERSAL JOINT

[75] Inventors: Hiroshi Sekine; Akira Aida, both of Takasaki, Japan

[73] Assignee: NSK Ltd., Tokyo, Japan

[21] Appl. No.: 08/910,254

[22] Filed: Aug. 13, 1997

[51] Int. Cl.$^6$ .................................................. F16D 3/26
[52] U.S. Cl. .............................................................. 464/134
[58] Field of Search .......................... 464/112, 134, 464/905; 403/57, 157, 158

[56] References Cited

U.S. PATENT DOCUMENTS

| | | | |
|---|---|---|---|
| 4,068,965 | 1/1978 | Lichti | 403/356 |
| 4,361,024 | 11/1982 | Haldric. | |
| 4,507,007 | 3/1985 | Mallet. | |
| 5,018,899 | 5/1991 | Kuribara et al. | 464/134 |
| 5,188,474 | 2/1993 | Ohkubo et al. | 464/134 |
| 5,575,581 | 11/1996 | BeBisschop | 464/134 |

FOREIGN PATENT DOCUMENTS

| | | |
|---|---|---|
| 0 309 344 | 3/1989 | European Pat. Off.. |
| 54-182755 | 12/1979 | Japan. |
| 55-68726 | 5/1980 | Japan. |
| 56-131029 | 10/1981 | Japan. |
| 63-131029 | 10/1981 | Japan. |
| 58-22414 | 5/1983 | Japan. |
| 58-193935 | 11/1983 | Japan. |
| 59-56424 | 4/1984 | Japan. |
| 62-36975 | 9/1987 | Japan. |
| 2-35223 | 2/1990 | Japan. |
| 3-41220 | 2/1991 | Japan. |
| 3-79570 | 12/1991 | Japan. |
| 4-75229 | 6/1992 | Japan. |
| 5-6225 | 1/1993 | Japan. |
| 7-317793 | 12/1995 | Japan. |
| 8-284968 | 11/1996 | Japan. |

*Primary Examiner*—Eileen Dunn Lillis
*Attorney, Agent, or Firm*—Vorys, Sater, Seymour and Pease LLP

[57] ABSTRACT

A universal joint comprises a pair of yokes each formed by bending a metal plate, a single piece of cross shaft for connecting the pair of yokes to each other so as to be capable of oscillating and displacing, and a bolt for fixing each of the yokes to an end portion of a shaft. The yoke includes a joint cylindrical portion provided at a proximal end portion thereof and having a discontinuous portion at one place in a circumferential direction, first and second flange portions provided in parallel to each other at a part of the joint cylindrical portion with the discontinuous portion sandwiched in therebetween, a through-hole formed in the first flange portion thereof in such a direction as to bear a torsion positional relationship with the joint cylindrical portion, a screw hole formed in a fixing portion of the second flange portion and disposed concentrically to the through-hole. The bolt has a large-diameter head portion formed at one end of a bar portion and a male screw portion formed similarly at the other end thereof, and is fastened in such as state that the bar portion is inserted into the through-hole from a side opposite to the screw hole, the male screw portion is screwed into the screw hole, and a one-side surface of the head portion is brought into contact with a one-side surface of the first flange portion, thereby pressing an outer peripheral surface of the shaft inserted into the joint cylindrical portion without a large gap and fixing the yoke to the shaft. A length from the one-side surface to an opening edge of the screw hole is set more than 2.6 times as large as a nominal diameter of the bolt.

10 Claims, 8 Drawing Sheets

UNIVERSAL JOINT

BACKGROUND OF THE INVENTION

1. Field of the Invention

The present invention relates generally to a universal joint and, more particularly, to a universal joint incorporated into a steering apparatus of, e.g., an automobile and utilized for transmitting motions of a steering shaft to a steering gear.

2. Related Background Art

For example, Japanese Utility Model Laid-Open Publication No. 59-56424 discloses a structure as shown in FIGS. 13–14, of a universal joint, incorporated into a steering apparatus, etc. of an automobile, for transmitting rotational motion between a pair of rotary shafts which do not exist on the same straight line. This universal joint 1 includes a pair of yokes 2a, 2b, a single piece of cross or cruciform shaft 3 for connecting the pair of yokes 2a, 2b to each other so as to be capable of oscillating and displacing, and bolts which are, though not illustrated, used for fixing the respective yokes 2a, 2b to end portions of unillustrated shafts.

Proximal ends of the yokes 2a, 2b, which are manufactured by effecting press working upon a metal plate such as a steel plate exhibiting a sufficient rigidity, are respectively provided with partially cylindrical joint portions (hereinafter joint cylindrical portions) 4a, 4b. Each of those joint cylindrical portions 4a, 4b has a discontinuous portion 5 at one place in a circumferential direction, an inside diameter of which is elastically reducible. A rugged portion like serration grooves is formed along an inner peripheral surface of each joint cylindrical portions 4a, 4b. Further, first and second flange portions 6, 7 are, with the above discontinuous portion 5 sandwiched therebetween, provided in parallel with each other in given portions of the respective joint cylindrical portions 4a, 4b. The first and second flange portions 6, 7 are formed with through-holes 8, 9 coaxial with each other in such a direction as to bear a cross positional relationship with each of the joint cylindrical portions 4a, 4b. Moreover, a nut 10 is fixed by welding to an outer surface (a lower surface in FIGS. 13 and 14) of the second flange portion 7, and a screw hole formed in this nut 10 is disposed coaxiallly with the through-holes 8, 9. Further, a pair of joint arm members 12, 12 extend in an axial direction from two positions, opposite to each other in a diametrical direction, of one edges of the respective joint cylindrical portions 4a, 4b in the axial direction. Then, circular holes 13, 13 are formed coaxially with each other in tip portions of the joint arm members 12, 12.

Further, the cross shaft 3 has four lengths of shaft members 14, 14. These shaft members 14, 14 are provided in such a state that the shaft members 14, 14 adjacent to each other are orthogonal to each other. These shaft members 14, 14 are rotatably supported through bearings inwardly of the circular holes 13, 13 formed at the tip portions of the joint arm members 12, 12. More specifically, bearing cups 15, 15 formed in a bottomed cylindrical shape by use of a rigid metal plate such as a case hardening steel, are press-fitted and fixed inwardly of those circular holes 13, 13. The tip portions of the shaft members 14, 14 are inserted in those bearing cups 15, 15, and a plurality of needles 16, 16 are provided between inner peripheral surfaces of the bearing cups 15, 15 and outer peripheral surfaces of the tip portions of the shaft members 14, 14, thus constituting a radial needle bearing.

The thus constructed universal joint 1 has the pair of yokes 2a, 2b fixed to end portions of a pair of shafts each disposed on a non-identical straight line, and a rotating force is transmittable between the pair of shafts. In order to fixedly join the yokes 2a, 2b to the end portions of the respective shafts, a bolt 17 (see FIGS. 1–11 which will be described later penetrating the through-holes 8, 9 formed in the first and second flange portions 6, 7, is screwed into the screw hole of the nut 10 and then fastened. That is to say, the bar member 18 of the bolt 17 is inserted into the two through-holes 8, 9 from the opposite side (an upper side in FIGS. 13 and 14) to the screw hole 11, and a male screw portion 19 provided at a proximal end of the bar member 18 is screwed into the screw hole 11. At the same time, a one-side surface of the head member 20 formed at the proximal end of the bar member 18 is brought into contact with a one-side surface (an upper surface in FIGS. 13 and 14) of the first flange portion 6. Bolts 17 are fastened from this corresponding state, and inside diameters of the joint cylindrical portions 4a, 4b are thereby decreased, whereby the outer peripheral surfaces of the ends of the above shafts are pressed by the inner peripheral surfaces of the joint cylindrical portions 4a, 4b. The outer peripheral surfaces of the ends of the shafts are also formed with serration rugged portions, and therefore the yokes 2a, 2b are firmly fixedly joined to the end portions of the shafts by fastening of bolts 17.

Note that the formation of the screw hole 11 through which the male screw portion 19 of the bolt 17 is screwed to the second flange portion 7 does not necessarily involve fixing the nut 10 to the outer surface of the second flange portion 7 by welding as illustrated in FIGS. 13 and 14. In addition, as disclosed in, e.g., Japanese Patent Laid-Open Publication No. 58-193935, a cylindrical nut member is fixedly fitted inside to a through-hole 9 formed in a second flange portion. Alternatively, as disclosed in Japanese Patent Laid-Open Publication No. 3-41220 and Japanese Utility Model Laid-Open Publication No. 55-68726 that will hereinafter be described, a screw hole is formed directly in a second flange portion 7 in place of the through-hole 9.

A distance between the first and second flange portions 6, 7 is narrowed by fastening the bolt 17. If a particular measure is not taken, however, the flange portions 6, 7 become unparallel to each other so that a distance between the tip portions (left end portions in FIG. 14) of the respective flange portions 6, 7 is especially reduced, whereas a distance between proximal ends (side edge portions of the joint cylindrical portions 4a, 4b, and right end portions in FIG. 14) thereof becomes larger than between the tip portions. As a result, a force in a bending direction is applied to the bolt 17 spanning the two flange portions 6, 7, and there might be a possibility in which the bolt 17 is broken off in an extreme case such as fastening the bolt 17 with a torque largely exceeding a specified value. Such being the case, according to the structure illustrated in FIGS. 13 and 14, the tip portions of the two flange portions 6, 7 are formed with bent portions 21, 21 bent toward the face-to-face flange portions 6, 7. When the distance between the tip portions of the two flange portions 6, 7 is reduced by fastening the bolt 17, tip edges of the two bent portions 21, 21 contact each other, thereby preventing the distance between the tip portions of the two flange portions 6, 7 from being further shrunk. Accordingly, the bolt 17 is prevented from being deformed enough to cause a damage thereto by decreasing a degree to which those two flange portions 6, 7 become unparallel.

Note that Japanese Utility Model Laid-Open Publication No. 59-56424 discloses a structure for decreasing the degree to which the pair of flange portions with a distance reduced by fastening the bolt become unparallel, and, in addition, the known structures are dealt with in Japanese Patent Laid- Open Publication No. 3-41220 and Japanese Utility Model Laid-Open Publication No. 55-68726. According to the structures disclosed in those Publications, some portions, for forming the first and second flange portions 6, 7, of the metal plate are folded double at 180 degrees or formed in padding to increase a thickness.

According to the prior art structures, the degree to which the first and second flange portions 6, 7 become unparallel is decreased for preventing the bolt 17 from being broken off by fastening the bolt 17. It is troublesome to manufacture those first and second flange portions 6, 7, and further it is inevitable that the weight of the first and second flange portions 6, 7 increases.

SUMMARY OF THE INVENTION

It is a primary object of the present invention, which was contrived under such circumstances, to provide universal joint capable of surely preventing a breakage of a bolt without making a manufacturing operation troublesome or increasing the weight of the universal joint.

To accomplish the above object, according to one aspect of the present invention, a universal joint comprises a pair of yokes each formed by bending a metal plate, a cross shaft for connecting the pair of yokes to each other so as to be capable of rocking, and a bolt for fixing one of the yokes to an end portion of a shaft. The one yoke includes a joint portion provided at a proximal end portion of the one yoke and configured to receive the end portion of the shaft, the joint portion having a discontinuous portion in a circumferential direction, first and second flange portions provided in parallel with each other and disposed to sandwich the discontinuous portion therebetween, a through-hole formed in the first flange portion, a member having a screw hole disposed on the second flange portion and coaxially with the through-hole, a pair of joint arm portions extending in an axial direction from two positions, opposite to each other in a diametrical direction, of one end of the joint portion, and a pair of circular holes formed coaxially with each other in tip portions of the joint arm members, respectively. The cross shaft has four shaft members arranged such that shaft members adjacent to each other are orthogonal to each other, and the cross shaft is rotatably supported through bearings inwardly of the pair of circular holes.

The bolt has a large-diameter head portion formed at one end of a bar portion and a male screw portion formed at another end of the bar portion, and is fastened in such a state that the bar portion is inserted into the through-hole from a side opposite to the screw hole, the male screw portion is screwed into the screw hole, and a surface of the head portion presses a surface of the first flange portion, thereby pressing an outer peripheral surface of the end portion of the shaft and fixing the one yoke to the shaft Notably, in the universal joint according to one aspect of the present invention, in a pre-tightened state when the surface of the head portion begins to press the surface of the first flange portion, a length from the surface of the head portion to an opening edge of the screw hole facing the head of the bolt is set to at least 2.6 times a nominal diameter of the bolt.

In the case of the thus constructed universal joint according to the present invention, the length from the surface of the head portion to the opening edge of the screw hole is set to at least than 2.6 times as large as the nominal diameter of the bolt, and therefore the bolt is hard to break off even when strongly fastening the bolt. Namely, the first and second flange portions become unparallel concomitantly with the strong fastening process of the bolt, and this bolt is bent. A bending degree (a curvature) thereof may not, however, become large. Hence, a stress applied to the bar portion of the bolt may also be small enough not to break the bolt off.

BRIEF DESCRIPTION OF THE DRAWINGS

Other objects and advantages of the present invention will become apparent during the following discussion in conjunction with the accompanying drawings, in which.

DESCRIPTION OF THE PREFERRED EMBODIMENTS

Figure 1:
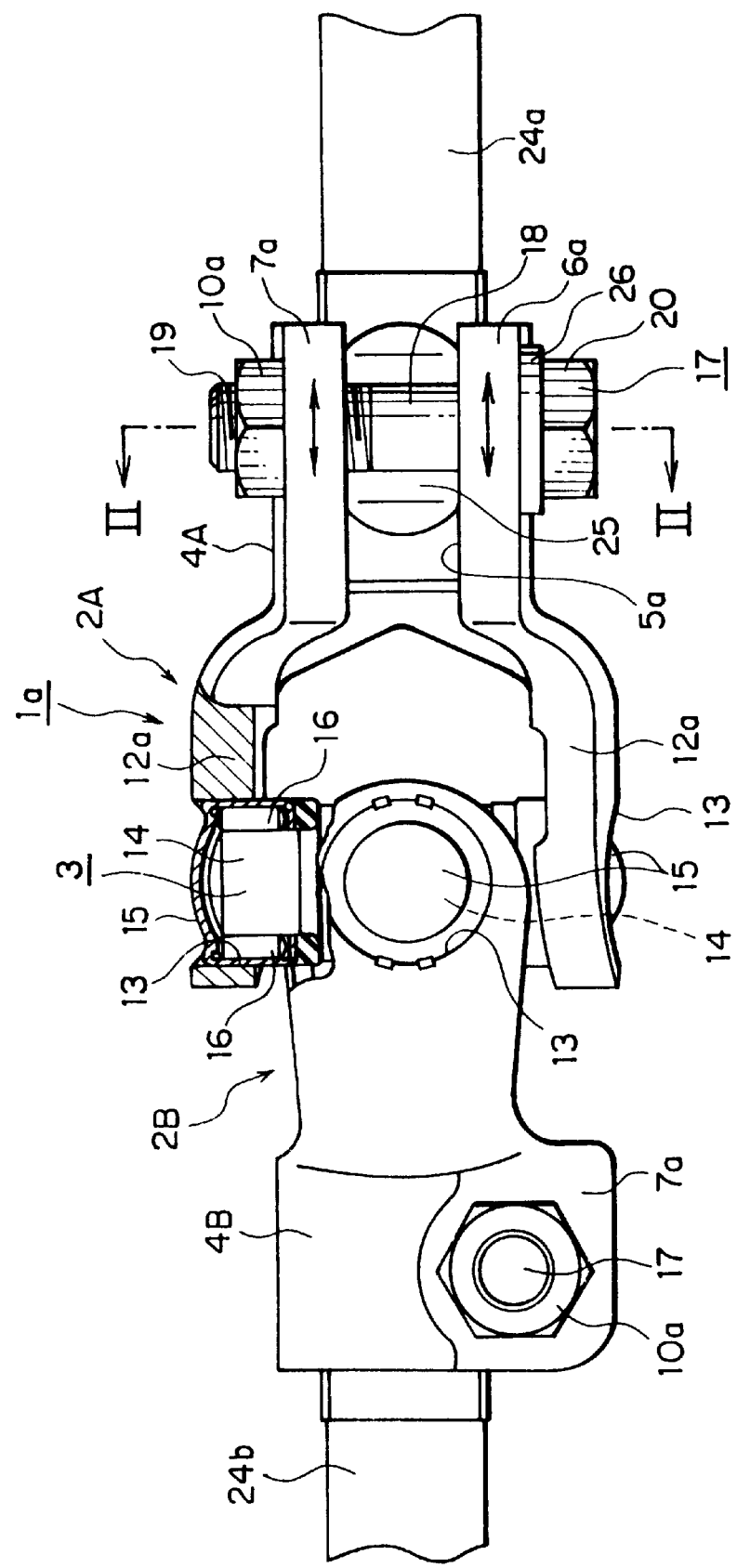
FIG. 1 is a partially cut-away side view showing a first embodiment of the present invention.
Figure 2:
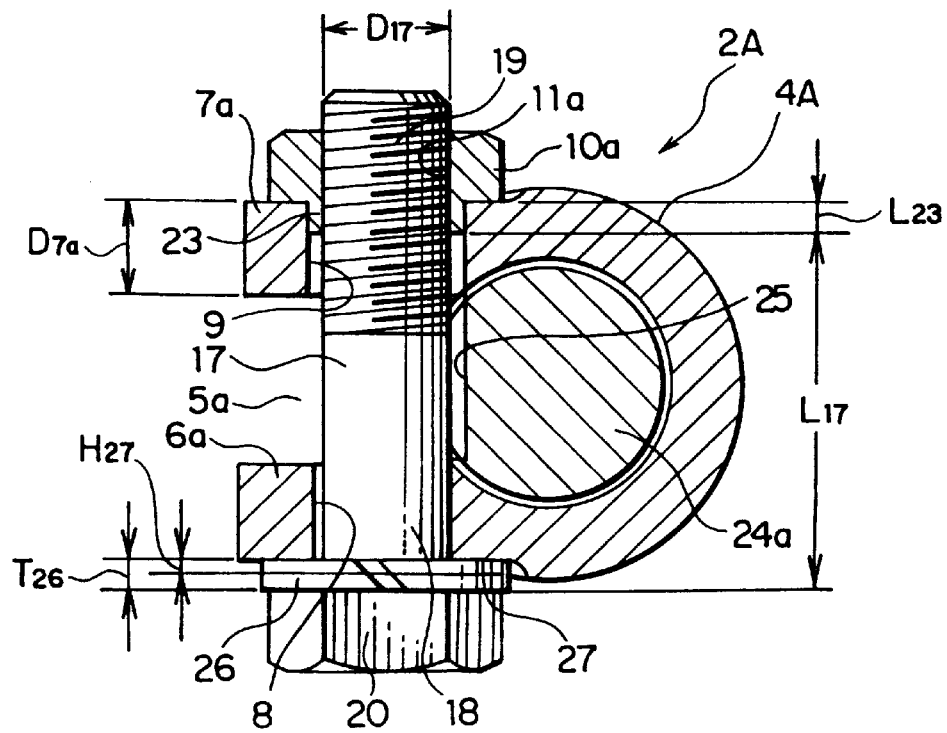
FIG. 2 is a sectional view taken along the line II—II in FIG. 1, showing a state before fastening a bolt.
Figure 3:
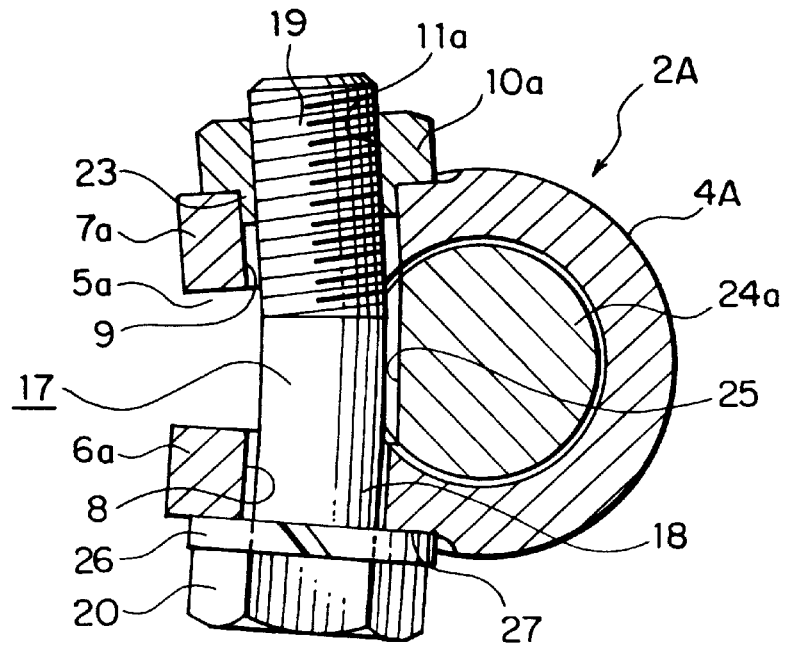
FIG. 3 is a sectional view taken along the same line as FIG. 2, similarly showing a state after fastening the bolt.

FIGS. 1–3 show a first embodiment of the present invention. A universal joint 1a according to the present invention includes a pair of yokes 2A, 2B, a single piece of cross or cruciform shaft 3, so called spider, for connecting the pair of yokes 2A, 2B to each other so as to be capable of oscillating and displacing (rocking), and bolts 17, 17 for fixing the respective yokes 2A, 2B to end portions of shafts 24a, 24b.

Proximal ends of the yokes 2A, 2B, which are manufactured by effecting press working upon metal plates exhibiting a sufficient rigidity such as, e.g., steel plates each having a thickness of approximately 5.5–7.5 mm, are respectively provided with joint cylindrical portions 4A, 4B. Each of those joint cylindrical portions 4A, 4B has a discontinuous portion 5a at one place in a circumferential direction, an inside diameter of which is elastically reducible. Female serration grooves are formed in an inner peripheral surface of each of those joint cylindrical portions 4A, 4B. Further, first and second flange portions 6a, 7a are, with the above discontinuous portion 5a sandwiched therebetween, provided in parallel with each other in given portions of the respective joint cylindrical portions 4A, 4B (in a state where a bolt 17 is not yet fastened with a nut 10a as shown in FIGS.

and 2). The first and second flange portions 6a, 7a are formed with circular through-holes 8, 9 coaxially with each other in such a direction as to bear a torsion positional relationship with each of the joint cylindrical portions 4A, 4B.

The nut 10a is fixedly fitted to an opening portion of an outer edge (an upper edge in FIGS. 2 and 3) of the through-hole 9, formed in the second flange portion 7a, of those two through-holes 8, 9. More specifically, a cylindrical portion 23 is formed along an inner edge surface (a lower edge surface in FIGS. 2 and 3) of the nut 10a, and is press-fitted into an outer edge opening portion of the through-hole 9, thereby fixedly supporting the nut 10a onto an outer surface of the second flange portion 7a. A screw hole 11a is formed extending to an opening edge of the cylindrical portion 23. A length dimension $L_{23}$ of the cylindrical portion 23 is, however, much smaller than a thickness dimension $D_{7a}$ of the second flange portion 7a ($L_{23} << D_{7a}$). Further, inner and outer peripheral surfaces of the cylindrical portion 23 are concentric to each other, and therefore the screw hole 11a and the through-hole 8 formed in the first flange portion 6a are disposed coaxially with each other.

A pair of joint arm members 12a, 12a extend in an axial direction from two positions, opposite to each other in a diametrical direction (from upper and lower positions in the case of the joint cylindrical portion 4A, and from the surface and underside in FIG. 1 in the case of the joint cylindrical portion 4B), of one edge in the axial direction (the left edge in FIG. 1 in the case of the joint cylindrical portion 4A, and the right edge in FIG. 1 in the case of the joint cylindrical portion 4B) of each of joint cylindrical portions 4A, 4B. Then, circular holes 13, 13 are formed coaxially with to each other in tip portions of the respective joint arm members 12a, 12a. Then, four lengths of shaft members 14, 14 constituting the cross shaft 3 are rotatably supported on the inner sides of the circular holes 13, 13 through radial needle bearings each constructed of a single bearing cup 15 and a plurality of needles 16, 16.

The thus constructed universal joint 1a is fixed to the end portions of the pair of shafts 24a, 24b used in a state where the pair of yokes 2A, 2B are disposed on non-identical straight lines, and a rotating force is thereby transmittable between the pair of shafts 24a and 24b. The respective yokes 2A, 2B are fixedly joined to the end portions of the shafts 24a, 24b, and, for this purpose, the bolt 17 inserted through the through-holes 8, 9 formed in the first and second flange portions 6a, 7a is screwed into the screw hole 11a of the nut 10a. To be more specific, a bar portion 18 of the bolt 17 is inserted into the two through-holes 8, 9 from the opposite side (a lower side in FIGS. 1–3) to the screw hole 11a, and a male screw portion 19 formed at the tip (an upper end in FIGS. 1–3) of the bar portion 18 is screwed into the screw hole 11a. A surface (an upper surface in FIGS. 1–3) of a head portion 20 formed at a proximal end (a lower end in FIGS. 1–3) of the bar portion 18, is brought into contact with an outer surface (a lower surface in FIGS. 1–3) of the first flange portion 6a through a spring washer 26.

The male screw portion 19 of the bolt 17 is thus screwed into the screw hole 11a of the nut 10a, and the spring washer 26 is just collapsed between the head 20 and the outer surface of the first flange portion 6a, in which state a length from a one-side surface of the head portion 20 of the bolt 17 to the opening edge of the screw hole 11a becomes $L_{17}$. In this state, the first and second flange portions 6a, 7a still remain free but are not substantially deformed. In the case of the universal joint 1a according to the present invention, the above length $L_{17}$ in this state is at least 2.6 times ($L_{17} \geq 2.6 \, D_{17}$) as large as a nominal diameter (a major diameter of external thread of the male screw portion 19) $D_{17}$ of the bolt 17.

According to the universal joint 1a of the present invention shown in FIGS. 1–3, in the consideration of the following items (1) to (3), the relationship between the above two dimensions $L_{17}$, $D_{17}$ ($L_{17} \geq 2.6 \, D_{17}$) is secured.

(1) For fixedly fitting the nut 10a to the opening portion of the through-hole 9, a length dimension $L_{23}$ of the cylindrical portion 23 formed in this nut 10a is set much smaller than the thickness dimension $D_{7a}$ of the second flange portion 7a ($L_{23} << D_{7a}$), and the opening edge of the screw hole 11a is positioned in a portion sufficiently recessed from the inner edge opening of the through-hole 9.

(2) The spring washer 26 having a sufficiently large thickness dimension $T_{26}$ is interposed between the surface of the head portion 20 of the bolt 17 and the outer surface of the first flange portion 6a, and the surface of the head portion 20 is positioned by the thickness dimension $T_{26}$ away from the opening edge of the through hole 8.

(3) A step $H_{27}$ of a recessed portion 27 in order to make the spring washer 26 closely contact therewith formed at the continuous portion between widthwise-directional one-side edge (a left edge in FIGS. 2–3) of the outer surface of the first flange portion 6a and the joint cylindrical portion 4A (4B), is set as small as approximately 0–1.5 mm. This arrangement together with an existence of the above scraped or recessed portion 27, restrains, down to a small level, a quantity with which the surface of the head portion 20 of the bolt 17 approaches the opening edge of the screw hole 11a.

As described above, the surface of the head portion 20 is brought into contact with the outer surface of the first flange portion 6a through the spring washer 26, from which state the bolt 17 is fastened to narrow down an interval between the first and second flange portions 6a, 7a, thereby reducing the inner diameters of the joint cylindrical portions 4A, 4B. Then, the outer peripheral surfaces of the edges of the respective shafts 24a, 24b are pressed by the inner peripheral surfaces of the joint cylindrical portions 4A, 4B. Male serrations are formed at the edges of those shafts 24a, 24b, while female serrations are formed in the inner peripheral surfaces of the joint cylindrical portions 4A, 4B. Therefore, the yokes 2A, 2B are firmly fixedly joined to the edges of the shafts 24a, 24b by fastening the bolts 17. Note that recesses 25 are formed in portions, facing to middle portions of the bolts 17, 17, at the side surfaces of the tips of the shafts 24a, 24b, thereby preventing the bolts 17, 17 from interfering with the tips of the shafts 24a, 24b.

Further, those shafts 24a, 24b are inserted in the joint cylindrical portions 4A, 4B without a large gap even before fastening the bolts 17, 17. Accordingly, when the bolts 17 are fastened from the state where the surface of the head portion 20 is brought into contact with the outer surface of the first flange portion 6a through the spring washer 26, the joint cylindrical portions 4A, 4B immediately start pressing the outer peripheral surfaces of the shafts 24a, 24b.

In the case of the thus constructed universal joint 1a according to the present invention, the length dimension $L_{17}$ extending from the surface of the head portion 20 constituting the bolt 17 up to the opening edge of the screw hole 11a of the nut 10a, is at least 2.6 times as large as the nominal diameter $D_{17}$ of the bolt 17. Hence, even when strongly fastening the bolt 17, the bolt 17 is difficult to break off. Namely, with the strong fastening of the bolt 17, as illustrated in FIG. 3, the first and second flange portions 6a, 7a become unparallel, and, as a result, the bolt 17 is bent as shown in FIG. 3. According to the present invention, a range (span) of being bent is large, and therefore a degree of this bending (curvature) decreases. In other words, when the first and second flange portions 6a, 7a become unparallel, the bar portions 18 of the bolts 17 are bent enough to compensate this unparallelism. According to the present invention, however, the bending range is large, and hence the bending quantity per unit length may be small, whereby the curvature can be prevented from increasing locally. Therefore, a stress upon the bar portion 18 of the bolt 17 may be small, with the result that the bolt 17 is hard to break off. Further, when using the universal joint, displacements in arrowed directions in FIG. 1 are caused in the first and second flange portions 6a, 7a. Based on these displacements, a bending load is repeatedly applied on the bar portion 18 of the bolt 17. With this bending load also, the bending quantity per unit length of the bar portion 18 may be small, and the bolt 17 is therefore hard to break off.

Note that in the great majority of cases, the universal joint incorporated into the steering apparatus of the automobile involves the use of an M8×1.25 bolt (having a nominal diameter of 8 mm and a pitch of 1.25 mm) as the bolt 17. Further, a material of which the bolt 17 is composed to be used herein may have a tensile strength on the order of 70–90 kgf/mm$^2$. Then, a fastening torque for the bolt 17 is set in many cases to 1.8–3.0 kg·m. As obvious from this numerical value, if a force acting in the bending direction is not applied on the bolt 17, it never happens that the bolt 17 is broken off even if the fastening torque is slightly larger than the set value (1.8–3.0 kg·m). In fact, however, as described above, the force in the bending direction is applied by degrees as the first and second flange portions 6a, 7a become unparallel. Then, a large tensile stress is applied locally enough lead it to such a possibility that the bolt 17 might be broken off. According to the present invention, the length dimension $L_{17}$ of the bending deformable portion of the bar portion 18 is increased, and the curvature of this deformable portion is restrained down to the small value (a radius of curvature is increased). The force acting in the bending direction enough to break off the bolt 17, is thereby relieved.

Figure 4:
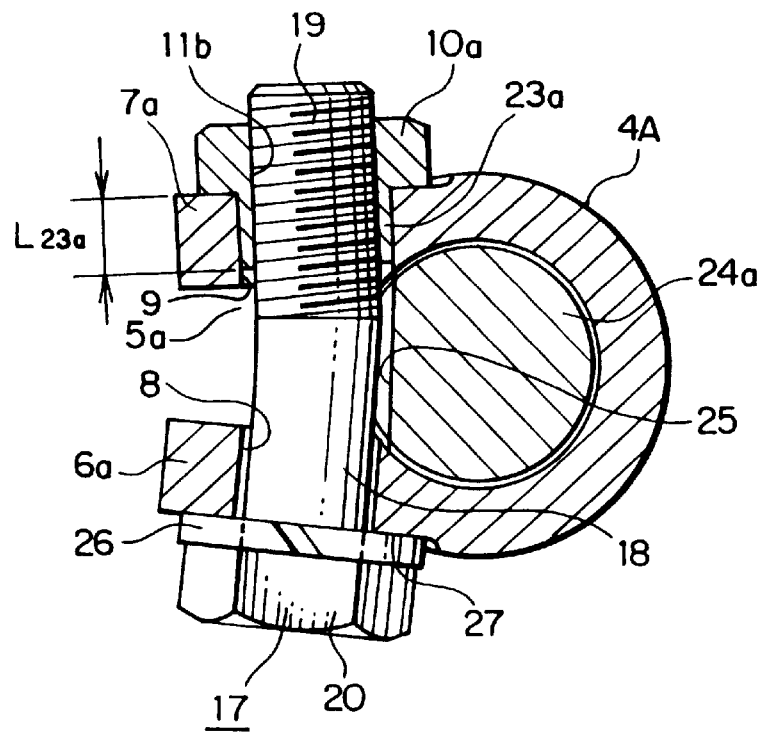
FIG. 4 is a sectional view similar to FIG. 3, showing a first comparative example in a state after fastening the bolt.
Figure 5:
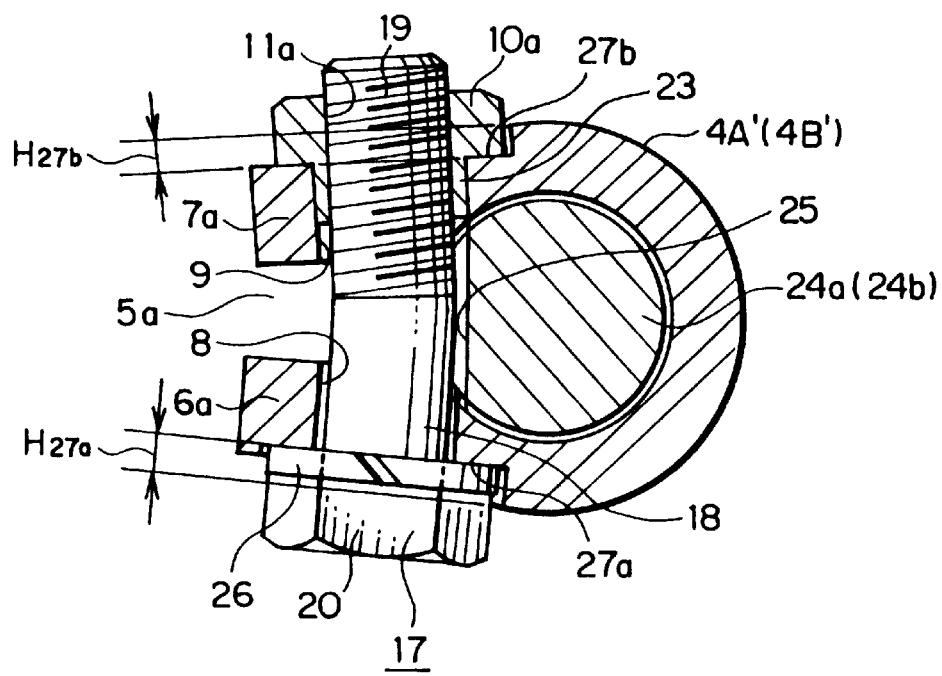
FIG. 5 is a sectional view similar to FIG. 3, showing a second comparative example in a state after fastening the bolt.
Figure 6:
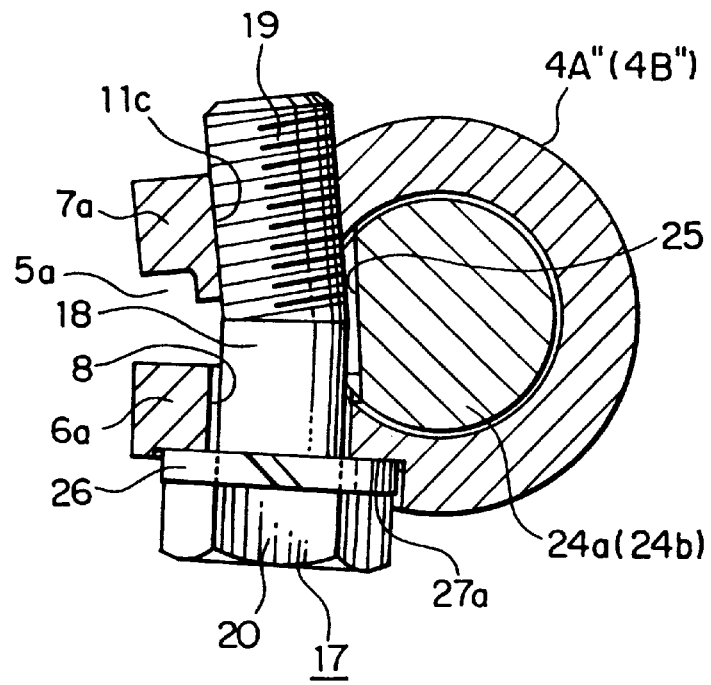
FIG. 6 is a sectional view similar to FIG. 3, showing a third comparative example in a state after fastening the bolt.

In contrast with this, each of structures shown in FIGS. 4–6 have a length dimension of the bending deformable portion of the bar portion 18 of the bolt 17 that is small, and, with the fastening process, the bar portion 18 is bent at a large curvature. To begin with, in a first comparative example shown in FIG. 4, a length dimension $L_{23a}$ of the cylindrical portion 23a formed at an inner edge surface of the nut 10a is large, and it is impossible to increase a length dimension with which the bar portion 18 is deformable, which dimension may be a distance between an opening edge of the screw hole 11b and the surface (an upper surface in FIG. 4) of the head portion 20 of the bolt 17. Further, in a second comparative example shown in FIG. 5, for enlarging a fitting range extending in a circumferential direction over a female serration in the inner peripheral surface of a joint cylindrical portion 4A' (4B') and the male serration on the outer peripheral surface of the shaft 24a (24b), there are increased steps $H_{27a}$, $H_{27b}$ ($H_{27a}$, $H_{27b}$≈2.5 mm) of recessed portions formed at the continuous or boundary portions between widthwise one-side edges (right edges in FIG. 5) of the outer surfaces of the first and second flange portions 6a, 7a and the joint cylindrical portion 4A' (4B'). Therefore, it is also impossible to enlarge the length dimension with which the bar portion 18 is deformable. In a third comparative example illustrated in FIG. 6, since a screw hole 11c is formed directly in the second flange portion 7a in place of the through-hole 9, the length dimension with which the bar portion 18 is deformable can not be increased either.

For instance, the present inventors manufactured yokes 4A (4B), 4A' (4B'), 4A" (4A") as shown in FIGS. 2, 5 and 6 by using steel plates each having a thickness dimension of 6 mm, fastened the bolt 17 in such a state as to insert the shaft 24a (24b), and measured a fastening torque enough to reach a breakage of the bolt 17. Consequently, the following results were obtained. The above M8×1.25 bolt was used as the bolt 17. Note that a plurality of test pieces were prepared for each structure, and hence there was some scattering of the measured values.

To start with, in the second and third comparative examples shown in FIGS. 5 and 6, a ratio of $L_{17}/D_{17}$ of the deformable length dimension $L_{17}$ of the bar portion 18 to the nominal diameter $D_{17}$ of the bolt, was approximately 1.7 to 2.3, and the ratiowith respect to any of the test pieces was under the range according to the present invention. When having fastened the bolt 17 with the structures in the second and third comparative examples shown in FIGS. 5 and 6 which bear the above-described dimensional relationship, the bolt 17 was broken off just when the fastening torque reached 4.0–5.0 kgf·m. In contrast with this, when having fastening the bolt 17 with the structure shown in FIG. 2 according to the present invention, by which the ratio of $L_{17}/D_{17}$ is 2.6 to 3.0, the bolt 17 was broken off just when the fastening torque reached 5.0–6.3 kgf·m. It was confirmed from this test that the present invention exhibits an effect of preventing the breakage of the bolt.

Incidentally, as stated in Japanese Utility Model Laid-Open Publication No. 55-68726, when having measured the fastening torque enough to reach the breakage of the bolt with such a structure that the portions constituting the first and second flange portions are folded double at 180 degrees, the bolt was broken off at the fastening torque of 5.0–6.0 kgf·m, or alternatively the screw hole formed directly in the second flange portion was broken theretofore. In a comparison between the structure disclosed in the above Publication and that according to the present invention, the fastening torques enough to break the parts are substantially the same. The structure disclosed in the above Publication is, however, difficult to manufacture because of the first and second flange portions as stated above, and results in increases in the weight of the first and second flange portions. Moreover, in the case of the structure disclosed in the above Publication, the first and second flange portions have a high rigidity, and therefore, in order to secure a joint strength of the yoke to the shaft, the fastening torque of the bolt must be increased to some extent. Whereas in the present invention, the first and second flange portions 6a, 7a are lightweight and easy to manufacture. Besides, these two flange portions 6a, 7a are deformed by a comparatively small force, so that the yokes 2A, 2B and the shafts 24a, 24b can be surely fixedly joined by the small fastening torque. As discussed above, according to the present invention, in spite of being fixedly joined by the small fastening torque, the torque is large enough to reach the breakage of the bolt 17, and the allowable range of the fastening torque of the bolt 17 can be therefore set large.

Figure 7:
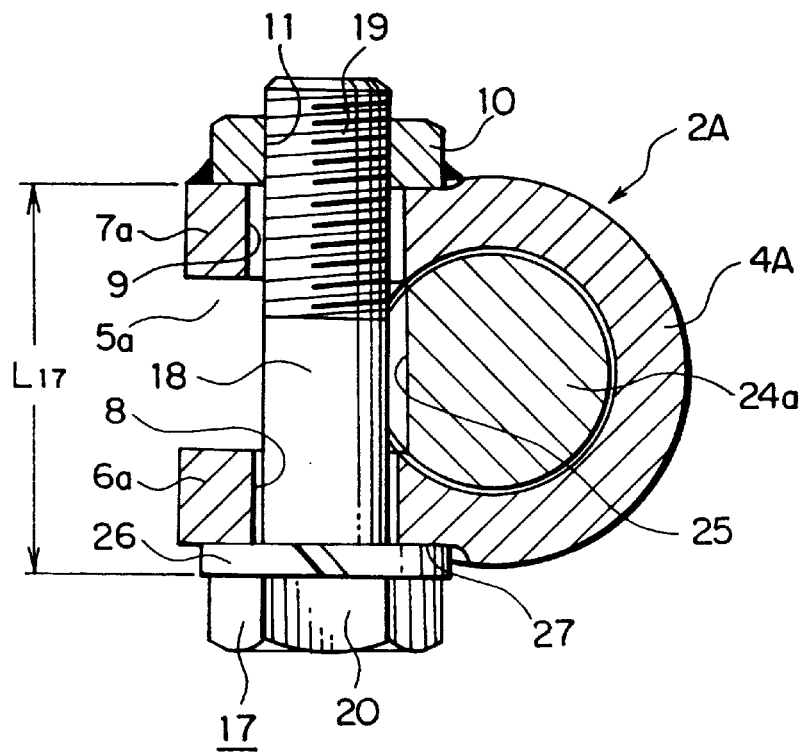
FIG. 7 is a view similar to FIG. 2, showing a second embodiment of the present invention.

Next, FIG. 7 shows a second embodiment of the present invention. In the second embodiment, the nut 10 is fixed by welding to the outer surface (an upper surface in FIG. 7) of the second flange portion 7a. The screw hole 11 formed in the nut 10 is disposed coaxially with the through-holes 8, 9 formed in the first and second flange portions 6a, 7a. In the second embodiment, the opening edge of the screw hole 11 exists in an outer surface position of the second flange portion 7a. Accordingly, the length dimension $L_{17}$ of the bending deformable portion of the bar member 18 constituting the bolt 17 can be set large, and the curvature of this portion can be restrained small. The configurations and operations of other portions are the same as those in the first embodiment discussed above.

Figure 8:
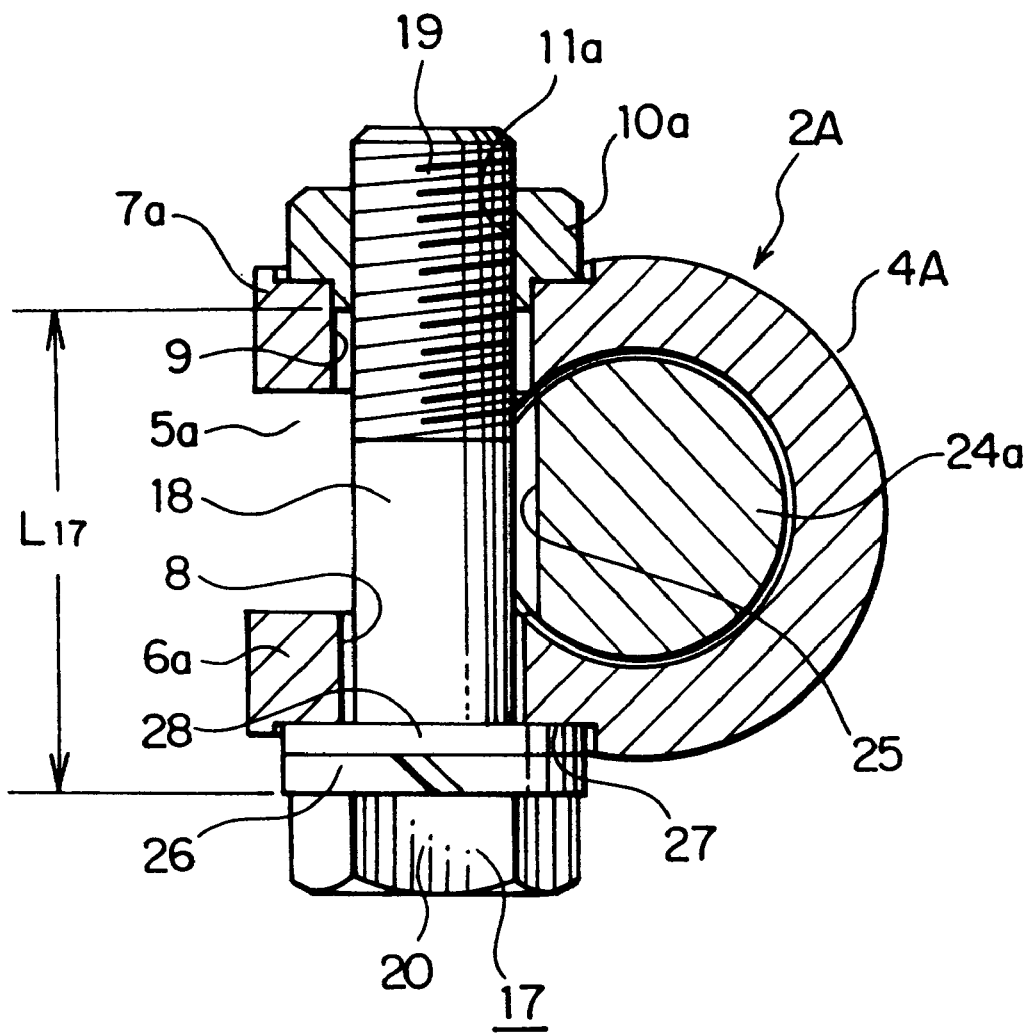
FIG. 8 is a view similar to FIG. 2, showing a third embodiment of the present invention.

Next, FIG. 8 illustrates a third embodiment of the present invention. In the third embodiment, between the spring washer 26 and the outer surface (a lower surface in FIG. 8) of the first flange portion 6a, another washer 28 is further sandwiched in therebetween. Accordingly, the length dimension $L_{17}$ of the bending deformable portion of the bar portion 18 constituting the bolt 17 is set larger by a thickness dimension of this washer 28 than in the first embodiment discussed above, and the curvature of this portion can be restrained small. The configurations and operations of other portions are the same as those in the first embodiment described above.

Figure 9:
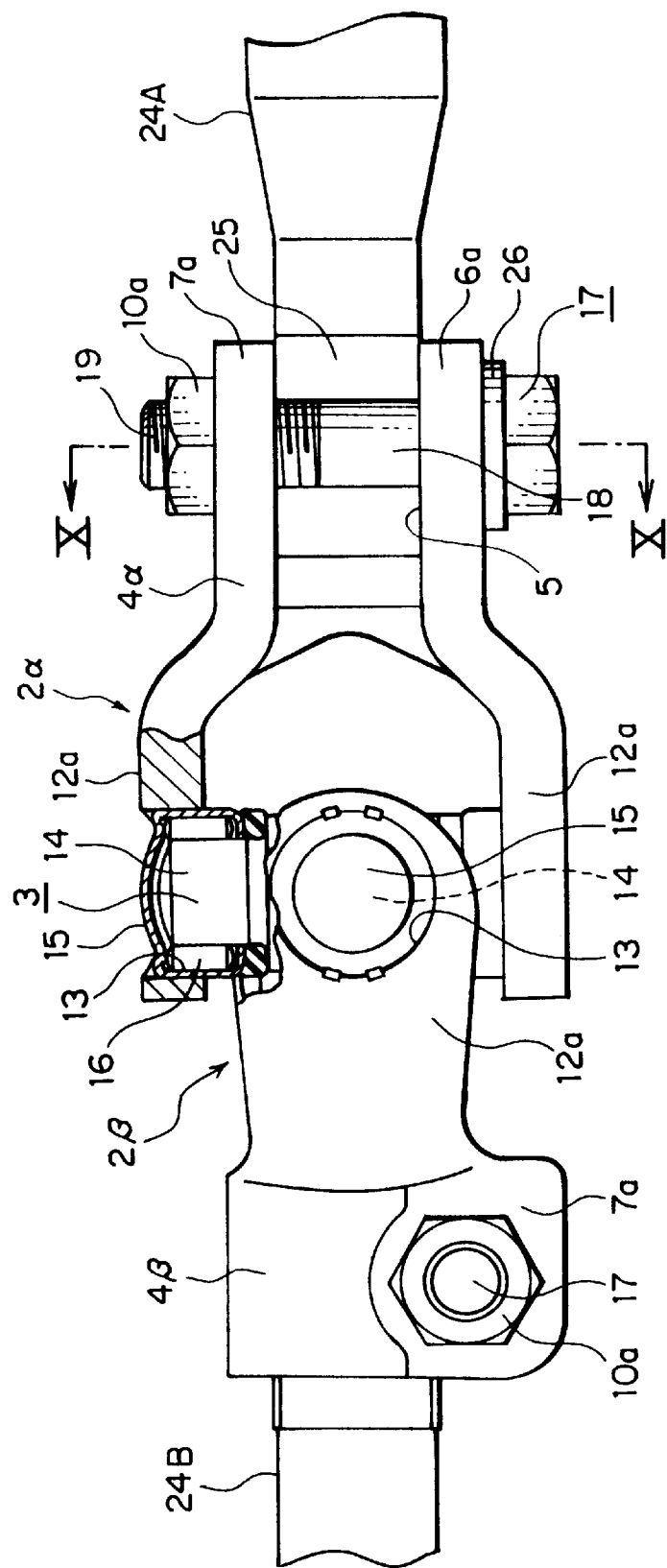
FIG. 9 is a partially cut-away side view showing a fourth embodiment of the present invention.
Figure 10:
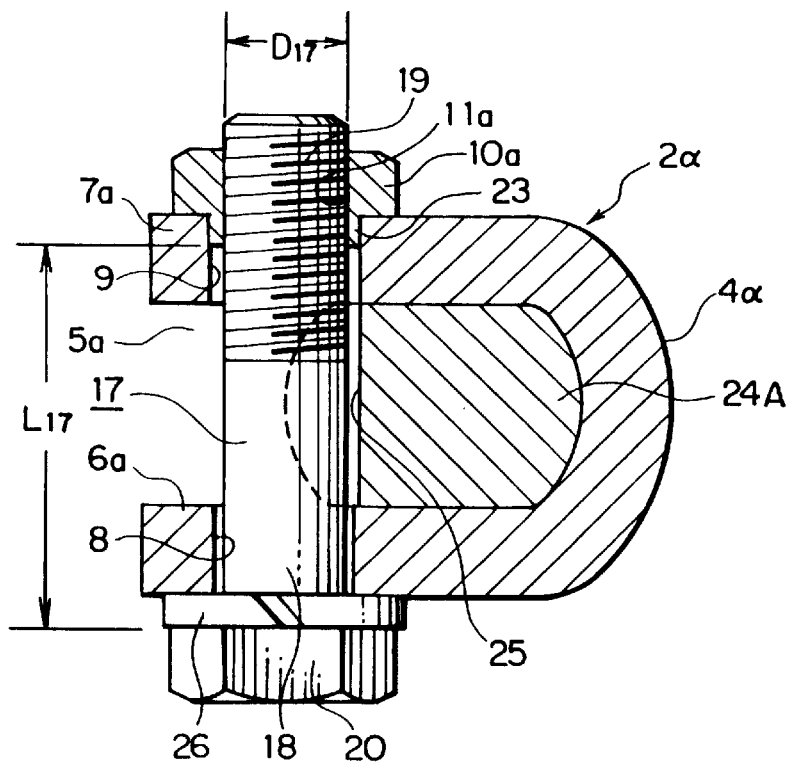
FIG. 10 is a sectional view taken along the line X—X in FIG. 9.

Next, FIGS. 9 and 10 show a fourth embodiment of the present invention. In the fourth embodiment, end portions of the shafts 24A, 24B are formed in an elliptical shape in section, and joint portions 4α, 4β provided at yokes 2α, 2β are also formed in a U-shape corresponding thereto. In the case of a structure in which the shafts 24A, 24B and the joint portions 4α, 4β are thus formed, it is also possible to prevent the breakage of the bolt 17 by setting the length $L_{17}$, extending from the surface (an upper surface in FIGS. 9 and 10) of the head portion 20 of the bolt 17 to the opening edge of the screw hole 11a of the nut 10a, at least 2.6 times as large as the nominal diameter $D_{17}$ of the bolt 17 ($L_{17} \geq 2.6$ $D_{17}$).

Figure 11:
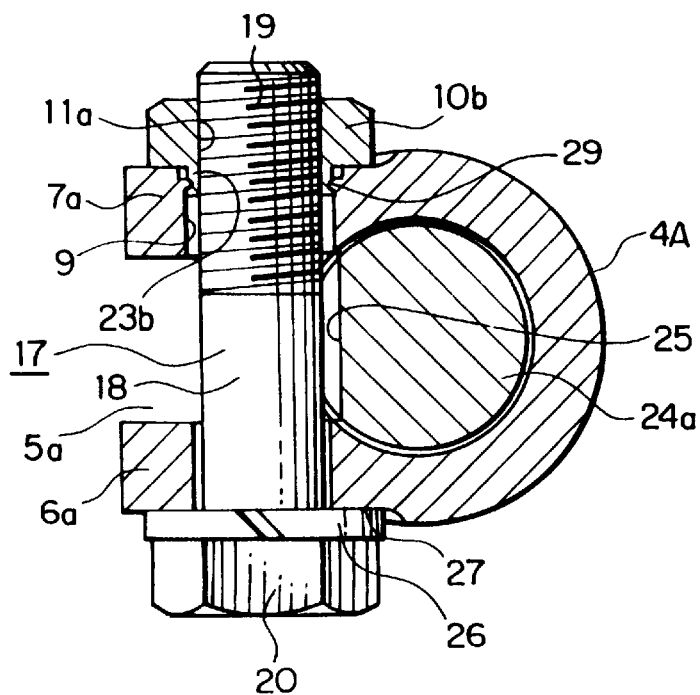
FIG. 11 is a partially cut-away side view showing a fifth embodiment of the present invention.
Figure 12:
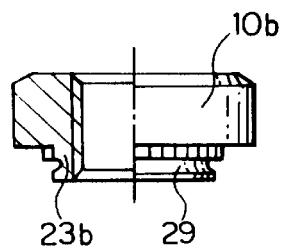
FIG. 12 is a half cut-away side view of a nut used in the fifth embodiment.
Figure 13:
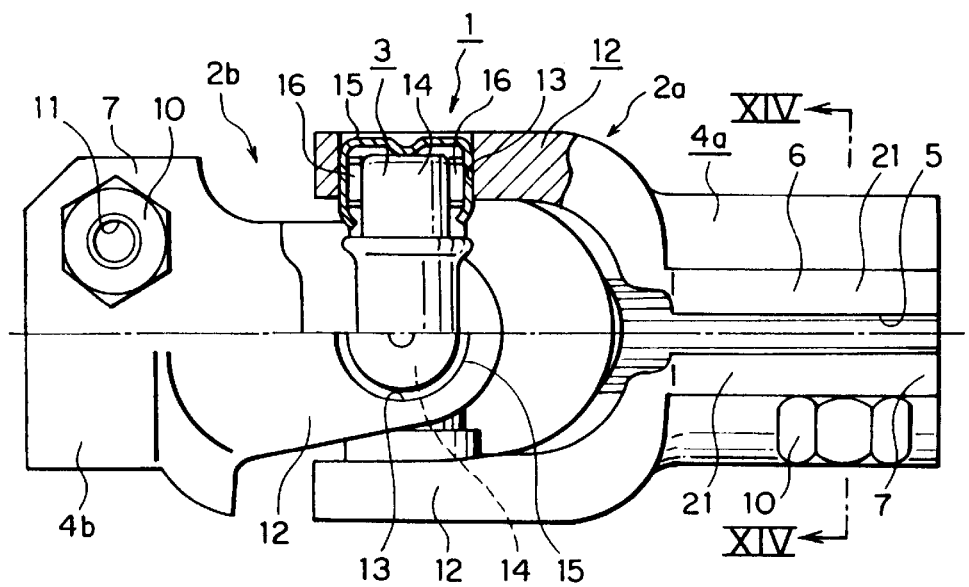
FIG. 13 is a partially cut-away side view showing one example of a prior art structure.
Figure 14:
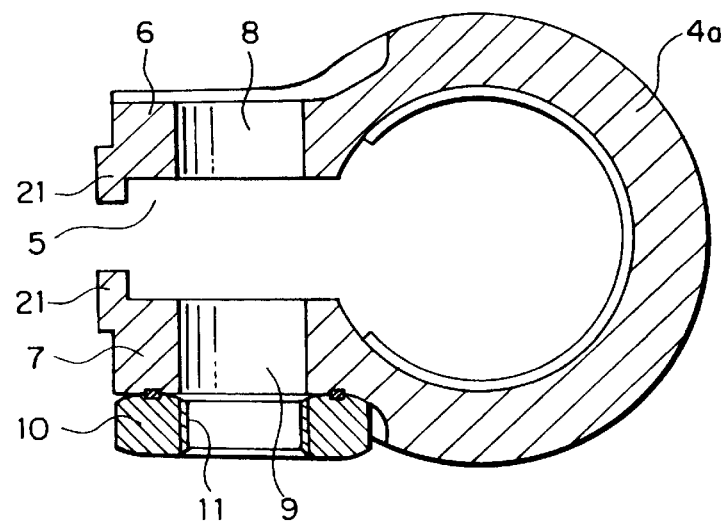
FIG. 14 is an enlarged sectional view taken along the line XIV—XIV in FIG. 13.

Next, FIGS. 11 and 12 show a fifth embodiment of the present invention. In the fifth embodiment, the nut assumes a configuration different from that in the first embodiment discussed above. More specifically, a nut 10b used in the fifth embodiment is formed with a recessed portion 29 extending along the whole periphery on an outer peripheral surface of a tip-half portion by effecting parallel-knurling process on an outer peripheral surface of a proximal half portion of a cylindrical portion 23b. When the thus constructed cylindrical portion 23b is press-fitted into the through-hole 9 of the second flange portion 7a, the parallel-knurled portion is press-fitted into the inner peripheral surface of the through-hole 9, and material of the pressed portion of the inner periphery of the through-hole 9 is moved into the recessed portion 29, thus engaging with this recessed portion 29. Accordingly, in the fifth embodiment, a motion of the nut 10b in the rotating direction is hindered by the parallel-knurled portion, while a motion in the axial direction is stopped by the recessed portion 29. The configurations and operations of other portions are the same as those in the first embodiment discussed above.

The universal joint according to the present invention is constructed and operates as discussed so far, and hence the bolt can be surely prevented from being broken off without making the manufacturing operation troublesome or increasing the weight. Further, the allowable range of the fastening torque can be set large, and therefore the assembling operation of the universal joint can be facilitated in addition thereto.

It is apparent that, in this invention, a wide range of different working modes can be formed based on the invention without deviating from the spirit and scope of the invention. This invention is not restricted by its specific working modes except being limited by the appended claims.

What is claimed is:

1. A universal joint comprising:

a pair of yokes each formed by bending a metal plate;

a cross shaft for connecting said pair of yokes to each other so as to be capable of rocking; and a bolt for fixing one of said yokes to an end portion of a shaft, said one yoke including:

a joint portion provided at a proximal end portion of said one yoke and configured to receive said end portion of said shaft, said joint portion having a discontinuous portion in a circumferential direction;

first and second flange portions provided in parallel with each other and disposed to sandwich said discontinuous portion therebetween;

a through-hole formed in said first flange portion;

a member having a screw hole disposed on said second flange portion and coaxially with said through-hole;

a pair of joint arm portions extending in an axial direction from two positions, opposite to each other in a diametrical direction, of one end of said joint portion; and a pair of circular holes formed coaxially with each other in tip portions of said joint arm members, respectively, wherein said cross shaft has four shaft members arranged such that shaft members adjacent to each other are orthogonal to each other, and said cross shaft is rotatably supported through bearings inwardly of said pair of circular holes, said bolt has a large-diameter head portion formed at one end of a bar portion and a male screw portion formed at another end of said bar portion, and is fastened in such a state that said bar portion is inserted into said through-hole from a side opposite to said screw hole, said male screw portion is screwed into said screw hole, and a surface of said head portion presses a surface of said first flange portion, thereby pressing an outer peripheral surface of said end portion of said shaft and fixing said one yoke to said shaft, and wherein, in a pre-tightened state when said surface of said head portion begins to press said surface of said first flange portion, a length from the surface of said head portion to an opening edge of said screw hole facing said head of the bolt is set to at least 2.6 times a nominal diameter of said bolt.

2. A universal joint according to claim 1, wherein a through-hole is formed in said second flange portion coaxially with said through-hole formed in said first flange portion, said member having said screw hole is partially disposed within said through-hole formed in said second flange portion, and the thickness of said second flange portion in a direction of the axis of said bolt is much greater than the thickness of a part of said member that is disposed within said through-hole formed in said second flange portion.

3. A universal joint according to claim 1, further comprising:

a plurality of washers sandwiched between said surface of said head portion and said first flange portion, said surface of said head portion pressing said surface of said first flange portion through said plurality of washers.

4. A universal joint according to claim 1, further comprising:

a spring member sandwiched between said surface of said head portion and said first flange portion, said surface of said head portion pressing said surface of said first flange portion through said elastic member.

5. A universal joint according to claim 1, wherein said shaft has a recess and, in said pre-tightened state, said bolt is partially disposed within said recess and does not directly contact said shaft.

6. A universal joint according to claim 5, wherein, in said pre-tightened state, said bar portion of said bolt does not directly contact said first and second flange portions.

7. A universal joint according to claim 5, wherein, in said pre-tightened state, said male screw portion of said bolt does not directly contact said first and second flange portions.

8. A universal joint according to claim 1, wherein said shaft is substantially cylindrical.

9. A universal joint according to claim 1, wherein said shaft is substantially elliptical.

10. A universal joint according to claim 1, wherein a through-hole is formed in said second flange portion coaxially with said through-hole formed in said first flange portion and the diameters of said through-holes formed in said first and second flange portions are each substantially larger than the diameter of said bar portion of said bolt.

* * * * *